United States Patent
Grzeszczuk et al.

(10) Patent No.: US 6,999,074 B2
(45) Date of Patent: Feb. 14, 2006

(54) BUILDING IMAGE-BASED MODELS BY MAPPING NON-LINEAR OPTIMIZATION TO STREAMING ARCHITECTURES

(75) Inventors: Radek Grzeszczuk, Menlo Park, CA (US); Karl E. Hillesland, Chapel Hill, NC (US); Sergey A. Molinov, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 131 days.

(21) Appl. No.: 10/302,650

(22) Filed: Nov. 22, 2002

(65) Prior Publication Data

US 2004/0100473 A1   May 27, 2004

(51) Int. Cl.
    *G06T 17/00*    (2006.01)
(52) U.S. Cl. .................. 345/420; 345/419; 345/426
(58) Field of Classification Search ........ 345/418–427, 345/581–582, 589
    See application file for complete search history.

(56) References Cited

U.S. PATENT DOCUMENTS

| | | | | |
|---|---|---|---|---|
| 5,754,182 A | * | 5/1998 | Kobayashi | 345/423 |
| 5,926,190 A | * | 7/1999 | Turkowski et al. | 345/473 |
| 6,016,150 A | * | 1/2000 | Lengyel et al. | 345/426 |
| 6,078,701 A | * | 6/2000 | Hsu et al. | 382/294 |
| 6,091,420 A | * | 7/2000 | Horikawa et al. | 345/419 |
| 6,128,417 A | * | 10/2000 | Ausbeck, Jr. | 382/288 |
| 6,288,721 B1 | * | 9/2001 | Donoghue et al. | 345/426 |
| 6,380,934 B1 | * | 4/2002 | Freeman et al. | 345/419 |
| 6,476,805 B1 | * | 11/2002 | Shum et al. | 345/420 |
| 6,504,538 B1 | * | 1/2003 | Freund et al. | 345/426 |
| 6,697,062 B1 | * | 2/2004 | Cabral et al. | 345/419 |
| 6,697,066 B2 | * | 2/2004 | Stuttard | 345/426 |
| 6,756,979 B2 | * | 6/2004 | Ohba et al. | 345/426 |

OTHER PUBLICATIONS

C.M. Bishop, "Neural Networks for Pattern Recognition," 1995, pp. 310-313, Clarendon Press.
Wei-Chao Chen, et al., "Light Field Mapping: Efficient Representation and Hardware Rendering of Surface Light Fields," To appear in the ACM SIGGRAPH conference proceedings, 2002, pp. 1-10.
Wei-Chao Chen, et al., "Light Field Mapping: Hardware-Accelerated Visualization of Surface Light Fields," Published as part of "Acquisiton and VIsualization of Surface Light Fields," SIGGRAPH 2001 Course Notes for Course 46, pp. 410-416, Aug. 2001.
B. Khailany, et al., "Imagine: Media Processing with Streams," IEEE Micro, Mar.-Apr. 2001, pp. 35-46.
M. McCool, et al., "Homomorphic Factorization of BRDFs for High-Performance Rendering," Proceedings of SIGGRAPH 2001, pp. 1-9.
W.H. Press, et al. "Numberical Recipes: The Art of Scientific Computing," 2nd Edition, 1992, pp. 463-467, Cambridge University Press.
Y. Sato, et al., "Object Shape and Reflectance Modeling from Observation," Proceedings of SIGGRAPH 97, pp. 379-388, Aug. 1997.
Y. Yu, et al., "Inverse Global Illumination: Recovering Reflectance Models of Real Scenes from Photographs," Proceedings of SIGGRAPH 99, pp. 215-227, Aug. 1999.

* cited by examiner

*Primary Examiner*—Matthew C. Bella
*Assistant Examiner*—Po-Wei Chen
(74) *Attorney, Agent, or Firm*—Steven P. Skabrat (57) ABSTRACT

Building an image-based model may be accomplished by defining an approximation set of functions for building a representation of the image-based model, defining an error function that quantifies how well the approximation set reproduces image data of the image-based model, and adjusting parameters of the approximation set to produce a best approximation to the image data.

18 Claims, 6 Drawing Sheets

BUILDING IMAGE-BASED MODELS BY MAPPING NON-LINEAR OPTIMIZATION TO STREAMING ARCHITECTURES

BACKGROUND

1. Field

The present invention relates generally to computer graphics and, more specifically, to image-based modeling.

2. Description

Accurate portrayal of the physical world has been an important goal of computer graphics since its inception. This includes modeling the geometry and surface attributes of the object when the object is illuminated by a light source and viewed in a virtual environment from a certain vantage point. Typically, the geometry is modeled as a polygonal mesh that models the geometric extents of the object. The surface attributes, which can be modeled in a number of ways, are then applied to the geometry during rendering to graphically display the object.

The essential part of the quest for realistic graphics is proper modeling of the visual attributes of the surfaces of objects. For example, proper modeling of surfaces that have luster, reflections, such as chrome reflections, semitransparent regions, complex textures like fur, and other qualities, is needed to create realistic visual models of many real-world objects. Theoretical and empirical approaches are possible.

Historically, parametric reflectance models, such as Phong shading, have been favored since they are simple and compact. However these techniques can be inaccurate, are difficult to implement on traditional graphics hardware, and are challenging to develop. An alternative is to use image-based techniques. Such image-based techniques offer a simple method of acquiring the visual data and an accurate method for portraying the physical world. They represent discrete visual data, acquired from the physical world using a variety of imaging devices, directly in the sample-based format without resorting to the parametric models. Image-based modeling refers to sampling the shape and/or appearance of an object using a set of images collected from an imaging device (such as a digital camera, for example), and building a three-dimensional (3D) model from the acquired image-based data. A user may then interact with the 3D model on a computer system. The resulting model can be either completely image-based or it can be a combination of geometry and image data. Image-based rendering refers to methods of visualizing image-based models. The amount of data associated with such a model can be enormous. This significantly limits use of the model, since storage, data transmission, and rendering suffer because of the large size of the model. In addition, many images may be needed to display the object from different viewing angles.

In the past few years, there has been a proliferation of image-based rendering and modeling techniques. These techniques are popular because they provide a simple acquisition method and an accurate portrayal of the physical world. These techniques help to solve one of the biggest performance bottlenecks in 3D graphics, photo-realistic 3D content creation.

While geometry reconstruction using 3D photography techniques has been studied extensively and significant progress has been made in this area, reconstruction of the radiance function of scanned objects is a fairly new field with scarce tangible results reported so far.

In "Object Shape and Reflectance Modeling from Observation", by Y. Sato, M. D. Wheeler, and K. Ikeuchi, Proceedings of SIGGRAPH 97 pages 379–388, August 1997, the authors estimate a fixed reflectance model from a set of images of an object captured under controlled lighting conditions. The work of Sato, et al. assumes every point on the surface of the model has the same reflectance properties. The method of Sato, et al. works by separating the diffuse and specular reflection components from the color image sequence and then estimating the reflectance parameters of each reflection component separately. The proposed method of Sato, et al. is closely tied to the specific reflectance model specified. The proposed method works only for objects made of uniform material that can be approximated reasonably well with the specified reflectance model.

In "Inverse Global Illumination: Recovering Reflectance Models of Real Scenes From Photographs", by Y. Yu, P. E. Debevec, J. Malik, and T. Hawkins, Proceedings of SIGGRAPH 99, pages 215–224, August 1999, the authors propose an approach that reconstructs the reflectance properties of a scene from a sparse set of photographs. Yu, et al. use an iterative optimization procedure that additionally allows the estimation of inter-reflections between surfaces in a scene. Yu, et al. call this procedure inverse global illumination. As with other known approaches, the method of Yu, et al. is limited to a predefined, low-parameter reflectance model that is not flexible enough to approximate complex surface material properties. The approaches of Sato, et al., and Yu, et al., are not robust because they require a heuristic procedure that separates the individual components of the reflectance model and estimates each one of the components independently.

Homomorphic factorization as described in "Homomorphic Factorization of BRDFs for High-Performance Rendering" by M. D. McCool, J. Ang, and A. Ahmad, Proceedings of SIGGRAPH 2001, pages 171–178, August 2001, generates a bi-directional reflectance distribution function (BRDF) factorization with positive factors only, which are easier and faster to render on current graphics hardware, and deals with scattered data without a separate re-sampling and interpolation algorithm. The algorithm of McCool, et al. deals with a special class of function factorizations $$f(x_1, \ldots, x_n) = \prod_{j=1}^{n} p_j(x_j) \qquad \text{(Equation 1)}$$

by taking the logarithm of both sides of Equation (1) and solving the resulting linear data fitting problem $$\tilde{f}(x_1, \ldots, x_n) = \sum_{j=1}^{n} \tilde{p}_j(x_j) \qquad \text{(Equation 2)}$$

Solving a linear system of equations takes $O(N^3)$ operations and requires $O(N^2)$ of intermediate storage, where N is the number of parameters being solved over, and the matrix is non-sparse. This non-sparsity is often the case in this formulation, where the radiance field is well sampled. In general, N will be on the order of $10^3$ to $10^4$, and therefore the method of McCool, et al. is fairly expensive both computationally and storage-wise. Additionally, homomorphic factorization can only handle a very narrow class of factorizations, which severely limits the generality of the method. Homomorphic factorization, which requires the inversion of a large matrix, is also not very conducive to parallelization and therefore cannot be mapped easily to streaming architectures.

Better techniques than are shown in the prior art are needed that make the representation of image-based models simple and more accurate. Such representations should be practical, compact, and easy to visualize on commodity graphics hardware.

BRIEF DESCRIPTION OF THE DRAWINGS

The features and advantages of the present invention will become apparent from the following detailed description of the present invention in which.

DETAILED DESCRIPTION

Embodiments of the present invention provide a general framework for computing a representation of image-based models by performing an optimization over parameters of the representation. One goal is to produce a representation that renders accurate results efficiently using graphics hardware and is as compact as possible given the computational constraints of a given hardware platform. It may be assumed herein that the geometry of the modeled object, or scene, is at least approximately known. Embodiments of the present invention focus on computing the representation of the object's light reflectance properties. The representation may be computed from image data samples that exemplify the appearance of the modeled object, or scene, under various viewing and lighting situations. A high compression ratio may be achieved by partitioning image data samples across small surface primitives and building the representation for each part independently. The partitioning may be done in such a way as to ensure continuous approximations across the neighboring surface elements.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

Figure 1:
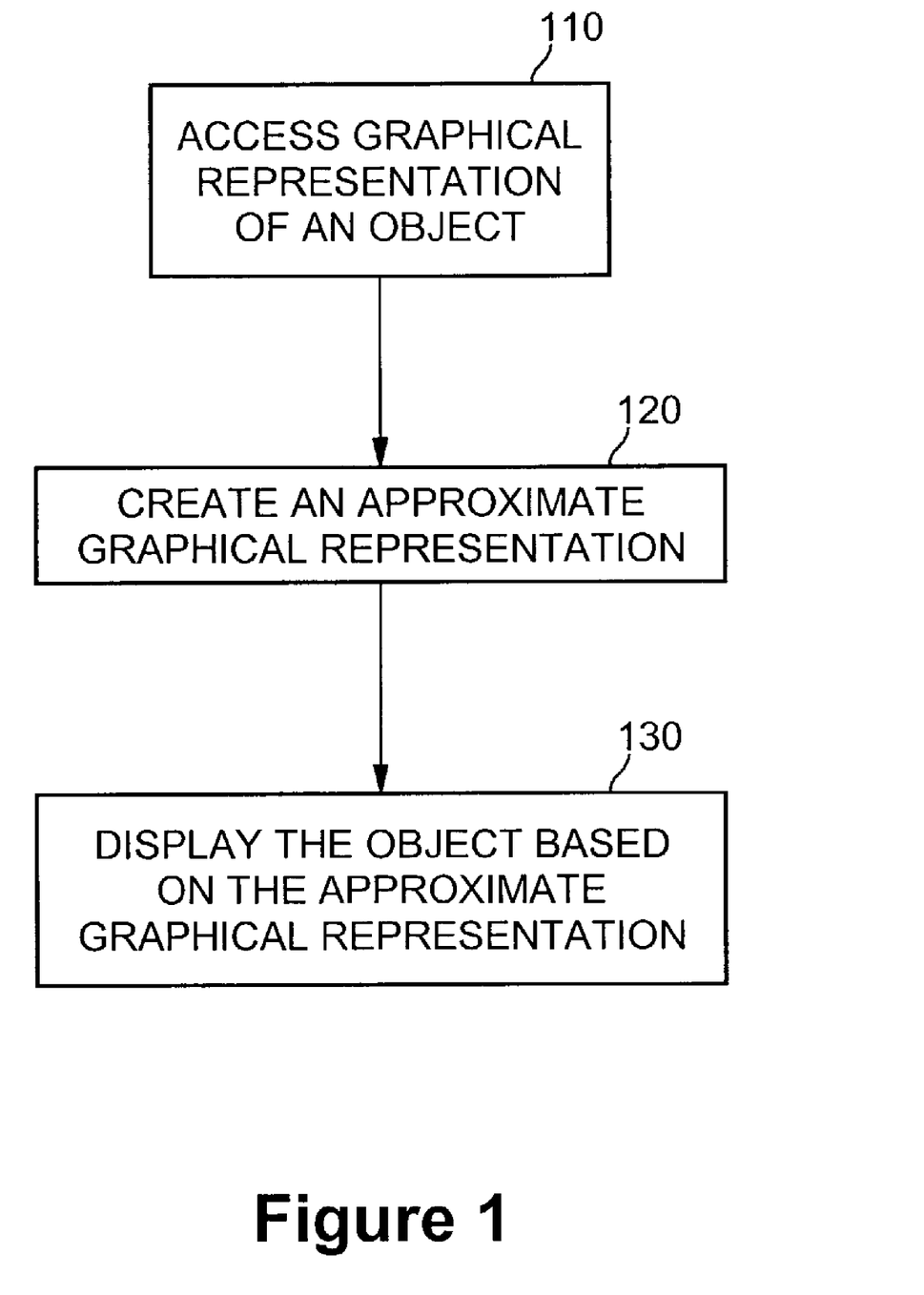
FIG. 1 is a flow diagram of a high level process for displaying an approximate graphical representation of an object, according to an embodiment of the present invention.

FIG. 1 shows a method for displaying an object using an approximate graphical representation of the object, according to one embodiment of the present invention. Block 110 shows accessing a graphical representation of the appearance of an object, such as a real object or a computer-generated object. Accessing may include loading the representation from a memory location or computer readable medium. Typically, the representation will include a geometry representation, which describes the geometry of the object, and a reflectance representation, which describes the reflective properties of the object.

The geometry representation will typically be polygonal representation, since many graphics pipelines are adept at rendering such representations. For example, the geometry representation may be a triangular mesh that defines the geometric extents of the object. The geometry representation may be empirically determined for a real object by using cameras, scanners, range sensing equipment, and mesh editing software.

The reflectance representation, which may also be called a surface light field, describes the visual appearance of the object, such as the radiance of the object or the light rays reflected by the object. The reflectance representation may describe the appearance when the object is viewed from multiple viewing directions. Frequently, the appearance representation will be a multidimensional appearance representation that includes one or more parameters sufficient to describe a location on the surface of the object, and one or more parameters sufficient to describe a viewing direction that the object is viewed from. For example, the appearance representation may be a four-dimensional representation, either a function or a data set, with two parameters to describe a position on the surface of the object and two parameters to describe a viewing direction. The appearance may vary from point to point and viewing direction to viewing direction, since this is typically the case for real objects.

Additional parameters may be included, such as to specify a location on the interior of the object, to specify motion of the object in space, and for other reasons that will be apparent to those skilled in the art. Since many real-world objects are viewed under constant lighting, such as an object illuminated by the sun or by fixed lighting in a room, the present disclosure will emphasize fixed lighting. However, the invention is equally applicable to variable lighting conditions, such as when lighting varies with time, location on the object, or viewing direction. Each of these additional factors adds a dimension to the graphical representation, so that representations with six or more dimensions may be common. Typically, multidimensional representations of six or higher dimensions become complicated to store and manipulate, requiring significant computing memory and communications capability.

The reflectance representation may be based on an empirical approach, such as image-based models. The graphical representation will typically be a set of images taken of the object from different viewing directions, or a data structure based on the set of images. The reflectance representation will typically be separated from the geometry representation, although they may be combined in other implementations.

Embodiments of the invention will be described herein in the context of a geometry representation that is a triangular mesh and a reflectance representation that is determined empirically by acquiring data for a real object from different viewing directions under constant lighting conditions. Those skilled in the art will recognize that the invention may be applicable to other geometry and reflectance representations. According to one embodiment, data acquisition is performed on a real object by taking pictures of the object from different viewing directions with a hand-held digital camera. The object is positioned on a platform with indicia or markings to assist in identifying the camera location. The camera location for each picture is determined based on the indicia. Between 150–300 images are collected of the object, although this number depends on the complexity of the object, such as the symmetry of the object and the level of detail, and the accuracy and quality of the representation. Software is then used to register the triangular mesh to each of the digital images. This registration can be performed with very low error, such as one or a few pixels. Preprocessing may also be performed on these images, such as to filter noise, put the data in a set that facilitates subsequent analysis, and to standardize the data.

Block 120 shows creating an approximate graphical representation based on the original graphical representation. Typically, the reflectance representation will be approximated, since it has more information than the geometry representation, although the geometry representation may also be approximated. The approximate representation may be created by compressing the original representation so that the representation may be stored in less total memory and transferred faster or with less bandwidth. Compressing may be done by removing redundancy from the set of digital images corresponding to different viewing directions. For example, important information from the set of digital images may be selectively represented in the approximate reflectance representation and redundant information may be selectively removed. The important information may be tied to heterogeneity in the object, since symmetry, similar surface attributes, and other features may add redundancy that can be selectively removed. If the information between different views is similar one can chose to retain the information only once. Specular and diffuse information may be separated so that only the changing information may be selectively represented. The compression may be done with spectral analysis of the appearance representation, such as that which is done in DCT approaches, and may be done by creating a codebook, such as in vector quantization.

In one embodiment, creating an approximate graphical representation may include creating a representation with at least one expression having fewer dimensions than an original multi-dimensional graphical representation by decomposing the original multi-dimensional representation. In one embodiment, all of the expressions in the approximate graphical representation have fewer dimensions than the original multi-dimensional graphical representation, although when they are combined, the combination may have the same number of dimensions as the original graphical representation. Decomposing may either select a subset of the most relevant information from the original representation or re-represent the relevant information.

Decomposing is to be interpreted broadly. Decomposing may include consolidating an n-dimensional cloud of disparate values, whether they are truly disparate or disparate due to noise or error, into a lower-dimensional approximation. For example, decomposing may include regression and other forms of statistical consolidation. Decomposing this may include linearly regressing a two-dimensional cloud of disparate values as a linear expression of a predictor. That is, a two-dimensional set of data may be approximated with a one-dimensional expression, such as a regression line.

Decomposing may also include projecting a multi-dimensional representation into a lower-dimensional subspace. According to one embodiment, principal component analysis is used to decompose a matrix by mathematically approximating each column of the matrix by its orthogonal projection onto the linear subspace spanned by K vectors, where K is an integer greater than or equal to one and that may be increased to improve the approximation of the original representation. The number of vectors K may be varied to provide varying levels of approximation. The original reflectance representation is first expressed as a matrix, such as by rearranging discrete data, then the matrix is decomposed, using principal component analysis, into a sum of products of vectors. The sum is then truncated and a few, most important, summation terms are kept. These vectors may be expressed as two-dimensional matrices, such as by rearrangement, to facilitate rendering.

Creating may include creating an approximate reflectance representation that is efficiently or quickly manipulated using multiprocessing or hardware operations. For example, the approximate graphical representation may be in a format supported by matrix operations, multitexturing operations, and other operations that allow more data and more complicated operations to be handled simultaneously or in fewer computer operations. For example, the approximate representation may include a first matrix portion to be multiplied by a second matrix portion, which can be quickly and efficiently performed using multitexturing hardware that allows multiple textures to be concurrently applied to a primitive in a single rendering pass. Rather than using hardware, the same format can be concurrently combined or multiplied using multiprocessing, in which multiple processors or multiple computers on a network may simultaneously process or combine the portions. According to one embodiment, the operations to remove redundancy produce data structures that may be combined directly, without decompression, to create an appearance for the object. This differs from other approaches such as run-length approaches, the Joint Photographic Experts Group (JPEG) standard, and others where the data structures cannot be combined directly until each are first decompressed.

Creating may include creating a viewing-dependent portion, which stores information for different viewing directions, and a position-dependent portion, which stores information for positions on the object (e.g., a triangle). The view-dependent portion may include view-dependent sub-portions that each correspond to a particular viewing direction, such that one of the view-dependent sub-portions is concurrently combined with the position-dependent portion to visualize the object from the particular viewing direction. The portions may be substantially different from images of the object take from different viewing directions and may be combined without interpolation to display the object with one appearance for one viewing direction and a different appearance for another viewing direction. For example, the portions may be matrices, which correspond to substantial manipulation and processing of images of the object from different viewing directions, that may be multiplied without interpolation using multitexturing hardware.

Block 130 shows rendering the object using the approximated reflectance representation. Rendering may include accessing the approximate reflectance representation, such as from a memory location, and concurrently processing multiple portions of the approximate reflectance representation to create, an appearance for the object or a portion of the object. The portions may have the characteristics discussed above, such as the fact that they may be combined with or without compression, some may be position-dependent and others viewing-dependent, the viewing-dependent portion may have sub-portions corresponding to particular viewing directions, and other features. The object may then be rendered and displayed by applying the appearances to the object and displaying the object on a display device.

Figure 2:
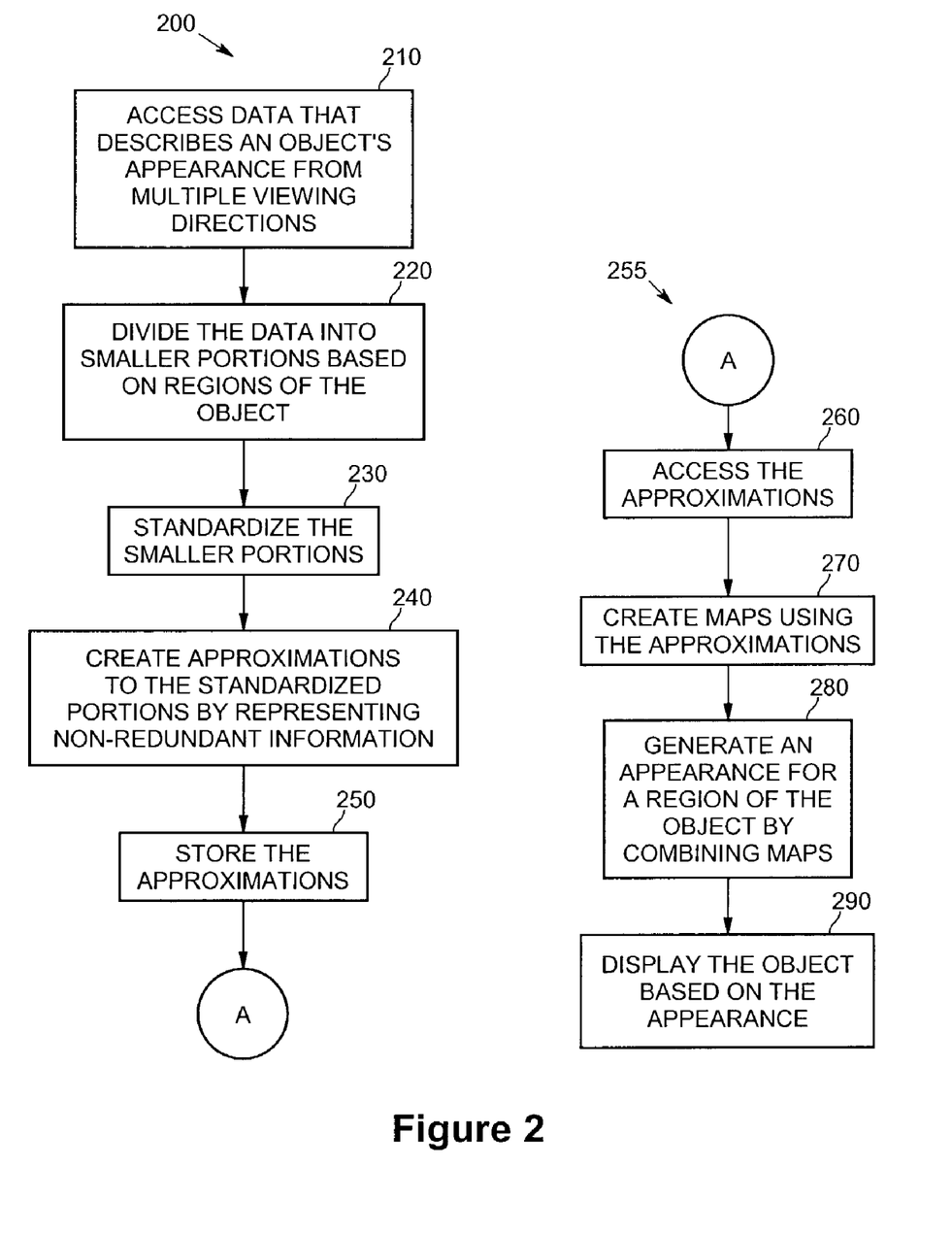
FIG. 2 is a flow diagram of creating approximate graphical representations and using the approximate graphical representations to display objects according to an embodiment of the present invention.

FIG. 2 shows an exemplary method for creating approximate graphical representations and using the approximate graphical representations to display objects, according to one embodiment of the present invention. According to one embodiment a group of blocks 200 may be performed at one point in time and a second group of blocks 255 may be performed at a different time or in real time. In one embodiment, the blocks 200 may be performed on a first computer system and the blocks 255 may be performed on a second computer system, such as if the approximations are created on the first computer system and distributed on computer-readable medium or transmitted via a transmission medium to the second computer system.

At block 210 image-based data that describes the appearance of an object from multiple viewing directions is accessed, such as from a memory. For example, the image-based data may be digital images of the object acquired from different known viewing directions as well as acquired geometry data that describes the geometric extents of the surface of the object. Frequently, the image-based data will provide a convenient and accurate way of representing the object, although non image-based data may also be used.

At block 220 the image-based data is divided or partitioned into smaller portions. Typically the smaller portions correspond to primitive-based regions, such as regions defined by triangles in the triangular mesh. For example, image data of the whole object may be divided into subsets of image data corresponding to multiple triangles in the triangle mesh that each describe the appearance within a triangle. In other embodiments partitioning may not be used, although partitioning frequently simplifies subsequent calculations, and allows higher compression if the smaller portions have a higher degree of spatial coherency than original set of image-based data, which is frequently the case.

At block 230 the plurality of smaller portions are standardized. Standardizing may include normalizing the size of each of a plurality of subsets of image-based data to a predetermined size, normalizing a shape of each of the plurality of subsets of image-based data to a predetermined shape. Standardizing may also include using the image-based data or the subsets of image-based data to compute re-sampled subsets of image-based data that correspond to predetermined standardized viewing directions. For example, the size and shape standardized subsets may be replaced by new subsets that correspond to predetermined standardized viewing directions.

At block 240 approximate graphical representations that approximate the standardized portions are created by selectively representing non-redundant information from the standardized portions. This may include removing redundant viewing direction information and redundant surface location information. Creating may include creating a first data structure that is independent of the viewing direction and a second data structure that includes a plurality of portions that each correspond to a different viewing direction for multiple primitive-based regions of the object.

At block 250 the approximate graphical representations may be stored. Frequently, the approximate graphical representations will be prepared ahead of time to facilitate and accelerate rendering and distribution of the representations.

The approximate graphical representations may be data structures that include a first portion and a second portion. The second portion may have view-dependent sub-portions that each correspond to viewing directions. The first portion may be combined with each of the view-dependent sub-portions to generate appearances for the particular viewing direction. These portions may be combined using hardware-assisted computation, such as multitexturing hardware.

At block 260 a plurality of approximate graphical representations are accessed, such as from a memory or from another computer connected via a transmission medium like the Internet. Accessing may include accessing a first data structure that is independent of the viewing direction and a second data structure that includes a plurality of portions that each correspond to a different viewing direction. These data structures may correspond to regions of the surface of the object, such as primitive-defined regions.

At block 270 a plurality of maps are created based on the approximate graphical representations. According to one embodiment, the maps may be considered matrices or may be expressed as matrices so that matrix operations may be performed on the maps. Some of the maps may be based on the first data structure that is independent of the viewing direction while other maps may be based on the second data structure. The maps based on the second data structure may have been configured for a particular viewing direction by selecting the particular subset of data from the data structure corresponding to the viewing direction. Creating the plurality of maps may include distorting the first data structure and the second data structure, such as warping, modulating, translating, or otherwise distorting the data structures.

At block 280 the maps are combined to generate an appearance for the object. The maps may be combined, according to certain predetermined combinations of the maps, to generate an appearance for the object or for a primitive-defined region of the object. Combining may include individually computing or rendering partial appearances of the object that may be combined with other partial appearances to create complete appearances. These complete appearances may be used to display the object on a display device.

At block 290 the object or a region of the object is displayed on a display device based on the appearance and the maps. The image displayed may be refined or improved by better approximating the appearance and combining more maps.

Figure 3:
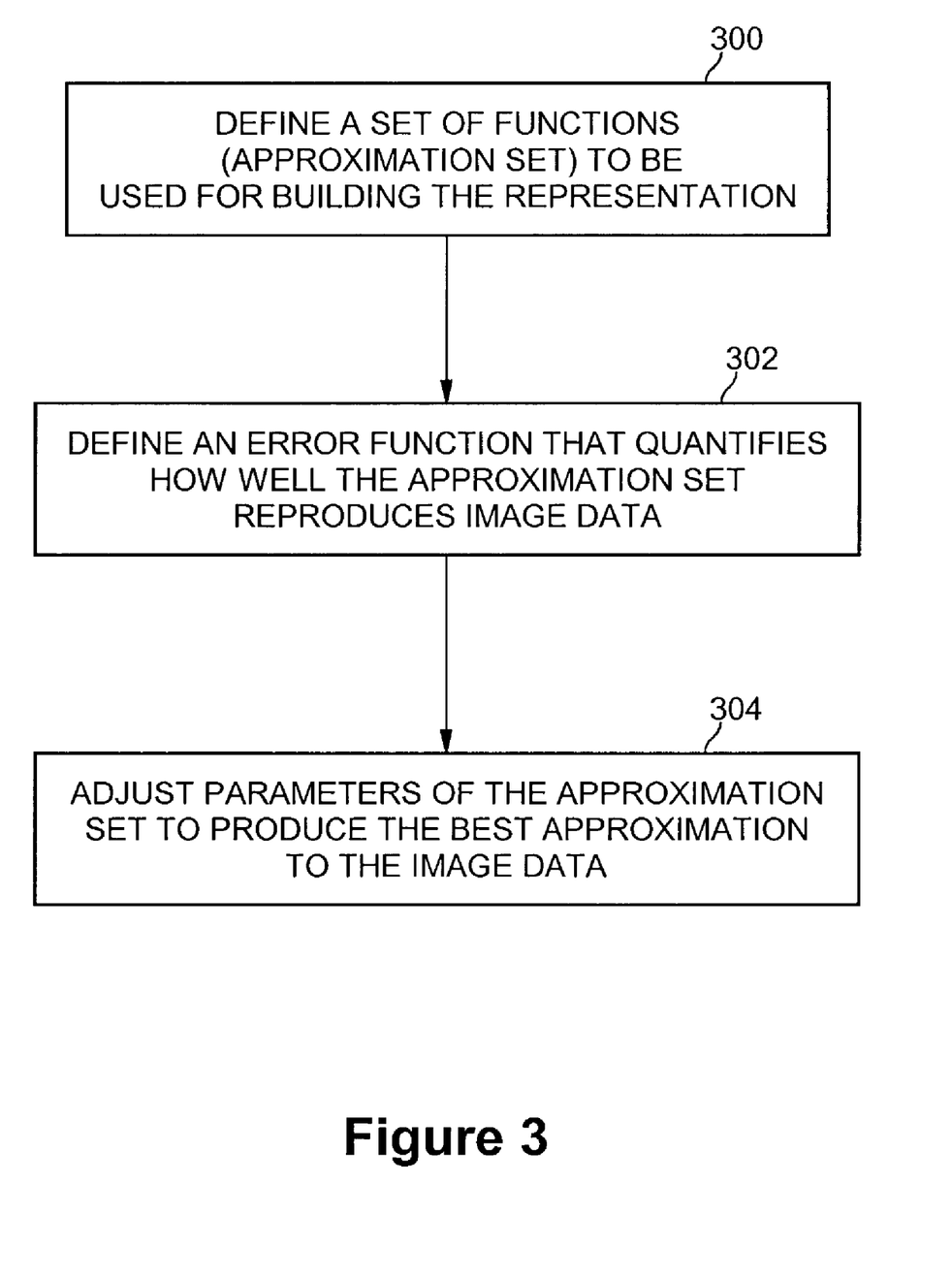
FIG. 3 is a diagram of a general framework for computing a graphical representation of image-based models according to an embodiment of the present invention.

A high level process for computing the graphical representation may be applied to each surface element. FIG. 3 is a diagram of a general framework for computing a graphical representation of image-based models according to an embodiment of the present invention. At block 300, a set of functions to be used for building the representation may be defined. This set of functions may be known as the approximation set, because they approximate the true radiance function describing the scanned objects. The underlying assumption is that this class of functions can be efficiently evaluated in graphics hardware, but this is not a requirement for the present framework to work.

At block 302, an error function may be defined that quantifies how well the approximation set of functions can reproduce the image data. At block 304, parameters of the approximation set may be adjusted so as to produce the best approximation to the image data. The parameter adjustment may be done through minimization of the error function. When the error function is at a minimum, the approximation is thought to be the best. The present invention handles the problem of irregular sampling of a radiance function, inherently present in construction of 3D models from image data, through the use of regularization and re-sampling. In the present invention this is done in the parameter space of the representation and not, like it has been done in the past, in the space of image data.

Nonlinear optimization has been applied in the past to a specific class of image-based models, where the user fits a low-parameter analytic function to sparse image data. For example, this has been done by Sato, et al. and Yu, et al. in the papers noted above. These approaches are difficult to automate because they depend on the user's knowledge of how to separate various components of a reflectance model. Without the separation, these prior art methods do not work very well. Additionally, nonlinear optimization of systems with small numbers of parameters, when well behaved, is computationally tractable. In embodiments of the present invention, the nonlinear optimization approach may be extended to deal with high parameter approximations to image data, enabling a completely automatic approximation step that does not require any user intervention. Embodiments of the present invention also overcome large storage and computation requirements traditionally associated with large nonlinear problems by taking advantage of the properties of image-based data. The present method is designed such that it can be implemented very efficiently on streaming architectures (e.g., as presented in "Imagine: Media Processing with Streams", by B. Khailany, W. J. Daily, S. Rixner, U. J. Kapasi, P. Mattson, J. Namkoong, J. D. Owens, B. Towles, and A. Chang, IEEE Micro, pages 35–46, March/April 2001).

Embodiments of the present invention may be applied to specific problems in image-based modeling. It provides benefits when applied to factorization of surface light fields. The performance of graphics systems may be improved, and the ease of implementation may be improved, as compared to the prior art. Embodiments of the present invention may also be used to simplify the factorization of a bidirectional reflectance distribution function (BRDF).

As noted, embodiments of the present invention describe a general framework for computing an efficient representation of image-based models by performing an optimization over the parameters of this representation. By partitioning the image data samples across small surface primitives and building the representation for each part independently, the present framework may be used to find a compact, accurate representation that is also efficient from the point of view of hardware accelerated rendering of the resulting models.

By exploiting the special structure of image-based data, according to embodiments of the present invention, optimization routines may be developed for building image-based models, with a large number of parameters, that are both efficient and accurate. Embodiments of the present invention require minimal storage overhead and do not involve a re-sampling step. The invention is particularly well suited for modeling of high dimensional functions where re-sampling is prohibitively expensive. Unlike the method of McCool, et al., which is limited to one type of radiance function approximation, embodiments of the present invention are more general and capable of producing a broader class of function approximations. These embodiments are also much more efficient and simpler to implement than the prior art. Additionally, the optimization algorithms discussed herein compute the solution iteratively using localized information only and, therefore, can be mapped easily to a streaming architecture. This allows a graphics system to take advantage of massive parallelism available in some streaming architectures.

The framework presented herein is general and may be applied to a variety of image-based modeling problems. However, in order to simplify the formulation, embodiments of the present invention are described herein using a specific image-based modeling problem—computing accurate, sample-based approximation of the outgoing radiance of an object with known geometry from a dense set of image data.

Figure 4:
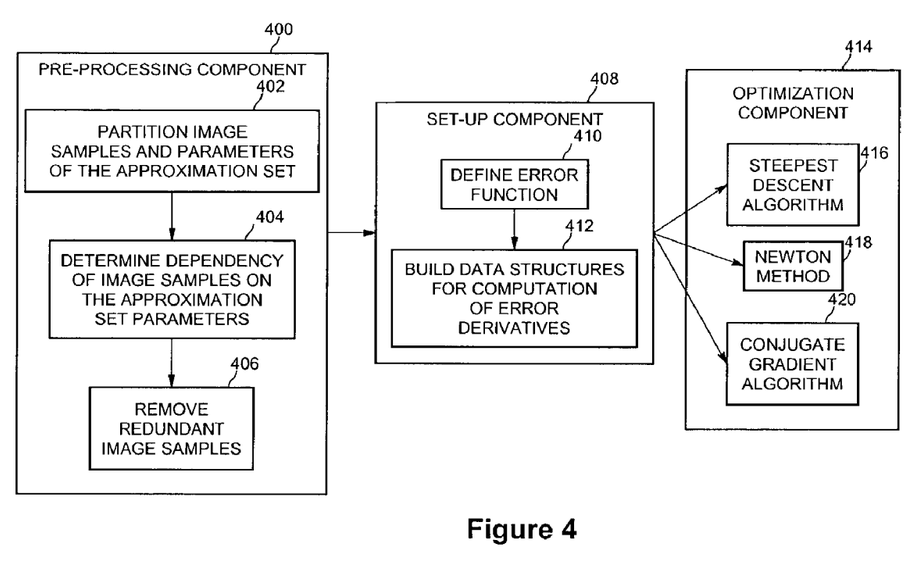
FIG. 4 is a flow diagram illustrating computing a representation of image-based models according to an embodiment of the present invention.

An embodiment of the invention may be divided into three components, each consisting of several steps, as shown in FIG. 4. Each component corresponds to one step in a data processing pipeline. A pre-processing component 400 may include at least three steps. At block 402, a complete image data set may be partitioned into separate image data sets around each vertex of a geometry mesh using a technique described in "Light Field Mapping: Hardware-accelerated Visualization of Surface Light Fields," by W-C. Chen, R. Grezeszczuk, and J-Y. Bouget, published as part of "Acquisition and Visualization of Surface Light Fields," SIGGRAPH 2001 Course Notes for Course 46, pages 410–416, August 2001; and "Light Field Mapping: Efficient Representation and Hardware Rendering of Surface Light Fields," by W-C. Chen, J-Y. Bouget, M. H. Chu, and R. Grzeszczuk, ACM Transactions on Graphics, 21(3): pages 447–456, July 2002. Block 402 also introduces an independent set of parameters for each approximation function. At block 404, the dependency between image samples and the parameters of the approximation set functions may be determined. At block 406, statistics on the image samples may be computed and samples that are redundant may be improved. In one embodiment, this block is optional and may be omitted. When included, this block may be used to improve the performance of the data processing pipeline.

A set-up component 408 may include at least two steps. At block 410, an error function may be defined. The error function may be used by optimization component 414. The error function builds data structures 412 necessary to efficiently compute the error and derivatives of the error with respect to parameters of the approximation set. The error function produces a metric as to how well the approximation set matches the radiance function. Minimizing the error metric produced by the error function results in the best approximation to the real object being modeled. Optimization component 414 is responsible for finding the optimal values of the approximation set parameters. In one embodiment, at least one of three known variants of the optimization component may be used. These three variants are the steepest descent algorithm 416, the Newton method 418, and the conjugate gradient algorithm 420.

In one embodiment, partitioning 402 of the image samples and parameters of the approximation set of the pre-processing component 400 may be implemented as follows.

Let f(u,v,y) be a radiance function defined on the surface of an object, where the parameters u and v describe the surface location and parameter vector $y=[y_1 \ldots y_k]^T$ denotes the parameters of the radiance function itself. Let m(u,v,y) denote the function to be used to approximate the radiance function and let $p=[p_1 \ldots P_m]^T$ be the vector of parameters of the approximate set. Let $T=[t^1 \ldots t_n]^T$, where $t_i=f(u_i,v_i,y_i)$ (i=1, . . . ,s), be the vector of radiance samples coming from the image data.

Assuming that the geometry of the models is represented as a triangular mesh, embodiments of the present invention partition the image data around each vertex of the mesh. The radiance function unit corresponding to each vertex may be referred to as the vertex radiance function and for vertex $v_j$ denote it as $f^{vj}(u,v,y)$. Partitioning is computed by weighting the radiance function $$f^{vi}(u,v,y)=\Lambda^{vj}(u,v)f(u,v,y) \qquad \text{Equation (3)}$$

where $\Lambda_{vj}$ is the barycentric weight of each point in the ring of triangles relative to vertex $v_j$. Note that the same type of partitioning was used in a technique described in "Light Field Mapping: Hardware-accelerated Visualization of Surface Light Fields," by W-C. Chen, R. Grezeszczuk, and J-Y. Bouget, published as part of "Acquisition and Visualization of Surface Light Fields," SIGGRAPH 2001 Course Notes for Course 46, pages 410–416, August 2001; and "Light Field Mapping: Efficient Representation and Hardware Rendering of Surface Light Fields," by W-C. Chen, J-Y. Bouget, M. H. Chu, and R. Grzeszczuk, ACM Transactions on Graphics, 21(3): pages 447–456, July 2002, for the case of surface light fields. There it was shown that this type of partitioning is very useful because it results in more coherent data sets that compress better and allows one to process and render each part of the radiance function independently. In this earlier work, it was shown how to use this type of partitioning to develop a very fast rendering algorithm that directly maps to a streaming architecture. Embodiments of the present invention outline a new decomposition algorithm that has the same properties. That is, it is very well suited for parallelization.

For each vertex radiance function, $f^{vj}(u,v,y)$, embodiments of the present invention have the corresponding approximation function $m^{vj}(u,v,y)$ that has its own set of parameters $p^{vi}$ and its own set of image samples $T^{vi}$. Since each vertex radiance function is processed independently using the same algorithm, an algorithm according to an embodiment of the invention is described herein for just one of them. Therefore, to simplify the notation, in the rest of this detailed description, the script $v_j$ used above will be dropped when referring to a vertex radiance function and its approximation.

In one embodiment, dependency of image samples on approximation set parameters 204 may be determined as follows. Which approximation set parameters depend on a given image sample $t_i=f(u_i,v_i,y_i)$ varies dramatically based on the approximation function used. For example, in case of a low-parameter analytical model, such as the known Lafortune model commonly used in computer graphics, every image sample depends on all approximation function parameters. Despite this global dependency between the image samples and the approximation set parameters, the optimization that seeks to fit this type of approximation function to image data is quite tractable from the point of view of computational resources because of the small number of parameters needed to solve for (the problem could still be difficult to solve from the point of view of numerical stability, since the dependency between various approximation set parameters could be highly nonlinear). The optimization problem becomes much more complicated when the number of approximation set parameters is large, on the order of thousands, as it is in the case of models used in "Light Field Mapping: Hardware-accelerated Visualization of Surface Light Fields," by W-C. Chen, R. Grezeszczuk, and J-Y. Bouget, published as part of "Acquisition and Visualization of Surface Light Fields," SIGGRAPH 2001 Course Notes for Course 46, pages 410–416, August 2001; and "Light Field Mapping: Efficient Representation and Hardware Rendering of Surface Light Fields," by W-C. Chen, J-Y. Bouget, M. H. Chu, and R. Grzeszczuk, ACM Transactions on Graphics, 21(3): pages 447–456, July 2002, and by McCool, et al.

Let s represents the number of image samples for the given vertex radiance function and n be the number of parameters in the approximation of the radiance function. Nonlinear optimization applied to the problem where both s and n are large is difficult because, in order to converge in a small number of iterations, this method requires the inversion of a matrix of size n×n at every iteration of the optimization algorithm. Matrix inversion is expensive because it requires $O(n^3)$ operations and $O(n^2)$ storage. The complexity presented here is for the Newton method that is known to have the best convergence rate. There are other optimization methods that are less expensive, but are often difficult to implement, sensitive to error and converge slower. Homomorphic factorization gets around the problem of minimizing a system of s nonlinear functions by solving an equivalent problem in the log domain. This approach requires only one inversion of matrix of size s×n. Unfortunately, the complexity of this one step is the same as the complexity of one non-linear optimization iteration and therefore still quite expensive. In at least one embodiment, the present invention finds the solution to the full nonlinear optimization problem in $O(n^2)$ operations and requires $O(n)$ storage while maintaining very good convergence rate. The key to obtaining such good performance is keeping track of the dependency of image samples on approximation set parameters.

In one embodiment, optional removal of redundant image samples 406 may be accomplished as follows. Image samples are often irregular, especially if the image data has been acquired using 3D photography techniques. Ideally, one would like to avoid using too many image samples, if they are redundant, and it is preferred to have at least one image example for each approximation set parameter. Regularization techniques can be used to ensure that every approximation set parameter is constrained by some image samples. To ensure that too many redundant samples are not used, a cap may be put on the maximum number of samples allowed. A good rule of thumb is to use a number of samples that is an order of magnitude larger than the number of approximation set parameters, e.g., s=10*n. It is preferred to choose image samples in such a way as to ensure roughly even distribution of samples across the approximation set parameters.

In one embodiment, set-up component 408 may be defined as follows. First, the optimization problem may be defined. Let $R(p)=[r_1(p) \ldots r_s(p)]^T$ be the residual function that is nonlinear in p and $$r_i(p)=t_i-m(u_i, v_i, y_i)) \qquad \text{Equation (4)}$$

denotes the i-th residual of function R(p). Next, the following nonlinear least squares problem may be solved (minimizing the error function)

$$\min_{p \in Rs} E(p) = 1/2 R(p)^T R(p) = 1/2 \sum_{i=1}^{s} r_i(p)^2 \qquad \text{Equation (5)}$$

The first derivative matrix of R(p) is the Jacobian matrix J(p), where $J(p)[i,j]=\theta_{ri}(p)/\theta_{pj}$ and the first derivative of E(p) is simply $$EE(p)=J(p)^T R(p) \qquad \text{Equation (6)}$$

One known technique for solving the nonlinear least squares problem (as discussed in the book "Numerical Methods for Unconstrained Optimization and Nonlinear Equations", Classics in Applied Mathematics, by J. E. Dennis, Jr., and R. B. Schnabel, 16. SIAM, 1996) is to apply a so called "steepest descent" method 416, which at each iteration moves by a small step in the negative direction of the gradient $$P_{k+1}=P_k-\lambda_k \nabla E(p_k) \qquad \text{Equation (7)}$$

Although each iteration of the steepest descent is fairly efficient, the algorithm requires many iterations to reach the minimum because of its slow convergence rate (the steepest descent method is linearly convergent).

The known Newton method 418, which uses a local quadratic model to solve the nonlinear least squares problem, converges much more rapidly than steepest descent (the Newton method is q-quadratically convergent). Each iteration of the Newton method is $$p_{k+1}=p_k-H(p_k)^{-1}\nabla E(p_k) \qquad \text{Equation (8)}$$

where $H(p_k)=\nabla^2 E(p_k)$ is the Hessian matrix. In the case of the nonlinear least squares problem $$H(p_k)=J(p_k)^T J(p_k)+S(p_k) \qquad \text{Equation (9)}$$

where $S(p_k)=\Sigma_{i=1}^{N} r_i(p_k)\nabla^2 r_i(p_k)$. One problem with the Newton approach is that matrix $H(p_k)$ of size n×n needs to be inverted at every iteration of this method, which is prohibitively expensive ($O(n^3)$ operations). There exist variants of the Newton method that compute the approximation of the inverse of the Hessian matrix incrementally (in $O(n^2)$ operations). However, these methods are fairly difficult to implement and are not directly applicable to the nonlinear least squares, because the portion $J(p_k)^T J(p_k)$ of the Hessian is readily available and should therefore be used directly instead of been approximated. At the same time, the portion $S(p_k)$ of the Hessian is inconvenient to obtain using these methods and it is also difficult to compute directly. Additionally, all Newton-like methods require $O(n^2)$ memory to store the Hessian.

Conjugate gradient algorithms 420 form a class of algorithms that choose the successive search directions so that the component of the gradient parallel to the previous search direction, which has just been made zero, is unaltered (as discussed in the book "Numerical Methods for Unconstrained Optimization and Nonlinear Equations", Classics in Applied Mathematics, by J. E. Dennis, Jr., and R. B. Schnabel, 16. SIAM, 1996). When applied to a quadratic problem of n parameters, this method guarantees to find the minimum in n steps.

At each iteration of the conjugate gradient algorithm, the weights are adjusted iteratively according the formula $$w_{j+1}=w_j+\alpha_j d_j+1 \qquad \text{Equation (10)}$$

where vectors $d_{j+1}$ represent the search directions. The search direction is chosen to be a linear combination of the current gradient and the previous search direction $$d_{j+1}=-g_{i+1}+\beta_j d_j \qquad \text{Equation (11)}$$

where the coefficients $\alpha_j$ are given as $$\alpha_j=d_j^T g_j \div d_j^T H d_j \qquad \text{Equation (12)}$$

and the coefficients $\beta_j$ are $$\beta_j=g_{i+1}^T g_{i+1} \div g_i^T g_i \qquad \text{Equation (13)}$$

Note the implicit use of Hessian to compute the coefficients $\alpha_j$ in Equation (12). Normally, the conjugate gradient algorithm will avoid the use of the Hessian matrix by performing a line minimization along the search direction to find the correct value of $\alpha_j$. However, this complicates the implementation of the conjugate algorithm and makes it less robust, since this algorithm is known to be very sensitive to the line search procedure. On the other hand, this modified version of conjugate gradient is very efficient because it converges in $O(n^2)$ operations and requires only $O(n)$ of additional storage.

In one embodiment, the error function 410 may be defined as follows. Herein, the rest of the data processing pipeline may be described with respect to a specific image-based modeling problem that has all the characteristics of difficult problems for which efficient solutions do not exist and which methods introduced here are meant to address—irregular image data, large number of image samples and approximation set parameters.

The approximation of the surface light field function as a sum of a small number of products of lower-dimensional functions may be $$f(r,s,\theta,\phi) \approx m(r,s,\theta,\phi) = \sum_{k=1}^{K} g_k(r,s)h_k(\theta,\phi). \qquad \text{Equation (14)}$$

This type of approximation was proposed in Chen, et al., where the functions $g_k(r,s)$ and $h_k(\theta,\phi)$ are encoded in a sampled form as texture maps. Herein, the functions $g_k(r,s)$ will be referred to as the surface maps and functions $h_k(\theta,\phi)$ will be referred to as the view maps. Given the formulation introduced in herein, the light field approximation function $m(r,s,\theta,\phi)$ has a set of parameters that correspond to the pixels of the surface maps and view maps.

For simplicity, assume that the number of summation terms in Equation (14) is equal to one $$f(r,s,\theta,\phi) \approx m(r,s,\theta,\phi)=g(r,s)h(\theta,\phi) \qquad \text{Equation (15)}$$

The parameters of the light field approximation function $m(r,s,\theta,\phi)$ as a vector $p=[s_{s1} \ldots s_{sn}v_{v1} \ldots v_{vn}]^T$, where the first sn values can be grouped as vector $s=[s_{s1} \ldots s_{sn}]^T$ that corresponds to the pixels of the surface map $g(r,s)$ and the last vn values can be grouped into vector $v=[v_{v1} \ldots v_{vn}]^T$ that corresponds to the pixels of the view map $h(\theta,\phi)$. The nonlinear least squares problem may be solved where $$r_i(p)=t_i-m(u_i,v_i,y_i))=t_i-g(r,s)h(\theta,\phi) \qquad \text{Equation (16)}$$

In one embodiment, data structures for computation of error derivatives 412 may be implemented as follows. In order to implement the optimization methods described above (e.g., steepest descent 416, Newton 418, and conjugate gradient 420), one needs to be able to efficiently compute the following expressions: $\nabla E(p_k)$ from Equation (7), $H(p_k)^{-1}$ from Equation (8), and $d_j^T H d_j$ used in Equation (12).

An observation that can be made is that both the first and the second derivatives of each residual with respect to the approximation set parameters p will have a very small number of nonzero entries. In fact, Equation (16) can be rewritten as $$r_i(p) = t_i - (a_i^T s_i)(b_i^T v_i) \qquad \text{Equation (17)}$$

where $a_i = [a_{i1}, a_{i2}, a_{i3}, a_{i4}]^T$ and $b_i = [b_{i1}, b_{i2}, b_{i3}, b_{i4}]^T$ are the vectors of bilinear interpolation weights and $s_i = [s_{i1}, s_{i2}, s_{i3}, s_{i4}]^T$ and $v_i = [v^{i1}, v_{i2}, v_{i3}, v_{i4}]^T$ are four pixels of the surface map and the view map, respectively.

Using Equation (17), the expression for the gradient may be rewritten as $$\nabla E(p_k) = \sum_{i=1}^{s} \nabla E_i(p_k) = \sum_{i=1}^{s} r_i(p_k) \nabla r_i(p_k) \qquad \text{Equation (18)}$$

where $$\nabla r_i(p_k) = \begin{bmatrix} b_i(a_i^T s_i) \\ a_i(b_i^T v_i) \end{bmatrix}. \qquad \text{Equation (19)}$$

Since the gradient for each residual in Equation (19) can be computed in constant time and the operation has to be repeated for each residual, the expression in Equation (18) can be evaluated in $O(s)$ operations and requires $O(s)$ of memory.

Computation of the inverse of Hessian required by each step of the Newton method normally requires $O(n^3)$ operations. However, if one notes the following property $$H(p_k)^{-1} = \sum_{i=1}^{s} H_i(p_k)^{-1} \qquad \text{Equation (20)}$$

where $H_i(p_k)^{-1}$ is the inverse of the Hessian matrix for residual $r_i$, it becomes possible to compute the inverse of the Hessian much more efficiently by performing incremental QR factorization using Jacobi rotations as discussed in "Numerical Recipes: The Art of Scientific Computing, 2$^{nd}$ Ed.," by W. H. Press, S. A. Tuekolsky, W. T. Vetterling, and B. P. Flannery, Cambridge University Press, 1992. Using this method, factorization of each $H_j(p_k)^{-1}$ can be computed using $O(n)$ operations. The total cost of evaluating equation (20) is therefore $O(sn)$ and requires $O(n^2)$. memory.

The denominator in Equation (12) may be rewritten as $$d^T H d = \Sigma d_i^T H_i d_i \qquad \text{Equation (21)}$$

Each term $d_i^T H_i d^i$ may be evaluated independently, which can be done in a constant number of operations, and the results may be summed. The total cost of evaluating equation (21) is therefore $O(s)$ and requires $O(n)$ memory.

Based on the derivations disclosed herein, it should be obvious to one skilled in the art how to implement efficiently all three optimization methods: steepest descent algorithm 416, Newton method 418, and conjugate gradient algorithm 420. Various combinations of the three methods may also be used. Out of the three methods, the conjugate gradient algorithm may provide advantages in some embodiments. First, the present implementation gives a closed-form solution for computation of $\alpha_j$'s in Equation (12). This means one does not have to implement the line search algorithm usually required by this method. This makes the present implementation simpler and more robust. Second, the conjugate gradient is guaranteed to converge in n iterations. This translates to the total cost of $O(sn)$ for the algorithm and total memory requirement of $O(n)$. The Newton method should have the same cost and memory requirements as the conjugate gradient algorithm, but it requires more storage: $O(n^2)$.

Embodiments of the present invention are more general and much more efficient computationally and storage-wise than the homomorphic factorization proposed by McCool et al. It is also much more robust and easy to implement, since it does not have to deal with the precision and cost of transforming the data to and from the logarithmic space as does the McCool et al. method.

Unlike an earlier approach by the inventor that was limited to the computation of just one type of representation through matrix factorization, embodiments of the present invention, based on optimization, can compute more general classes of representations. The inventor's previous approaches are described in "Light Field Mapping: Hardware-accelerated Visualization of Surface Light Fields," by W-C. Chen, R. Grezeszczuk, and J-Y. Bouget, published as part of "Acquisition and Visualization of Surface Light Fields," SIGGRAPH 2001 Course Notes for Course 46, pages 410–416, August 2001; and "Light Field Mapping: Efficient Representation and Hardware Rendering of Surface Light Fields," by W-C. Chen, J-Y. Bouget, M. H. Chu, and R. Grzeszczuk, ACM Transactions on Graphics, 21(3): pages 447–456, July 2002. As a result, embodiments of the present invention can produce even more compact 3D models, and can handle larger data sets with more complex radiance functions. (Matrix factorization works successfully only on a certain class of radiance functions that are well separable). Additionally, the present optimization framework eliminates re-sampling of image data, which is required by the matrix factorization approach. Re-sampling increases the complexity of the data processing pipeline. The matrix factorization approach also increases the amount of data to process, which is particularly troublesome for high dimensional problems. Additionally, matrix factorization has the same order of complexity as homomorphic factorization, both in terms of storage and computation, and is therefore significantly slower than embodiments of the present invention. Matrix factorization is also not very conducive to parallelization, and therefore cannot be mapped easily to streaming architectures. For these, and other reasons, embodiments of the present invention provide advantages over matrix factorization, homomorphic factorization, inverse global illumination, and the fixed reflectance model of Sato, et al.

Figure 5:
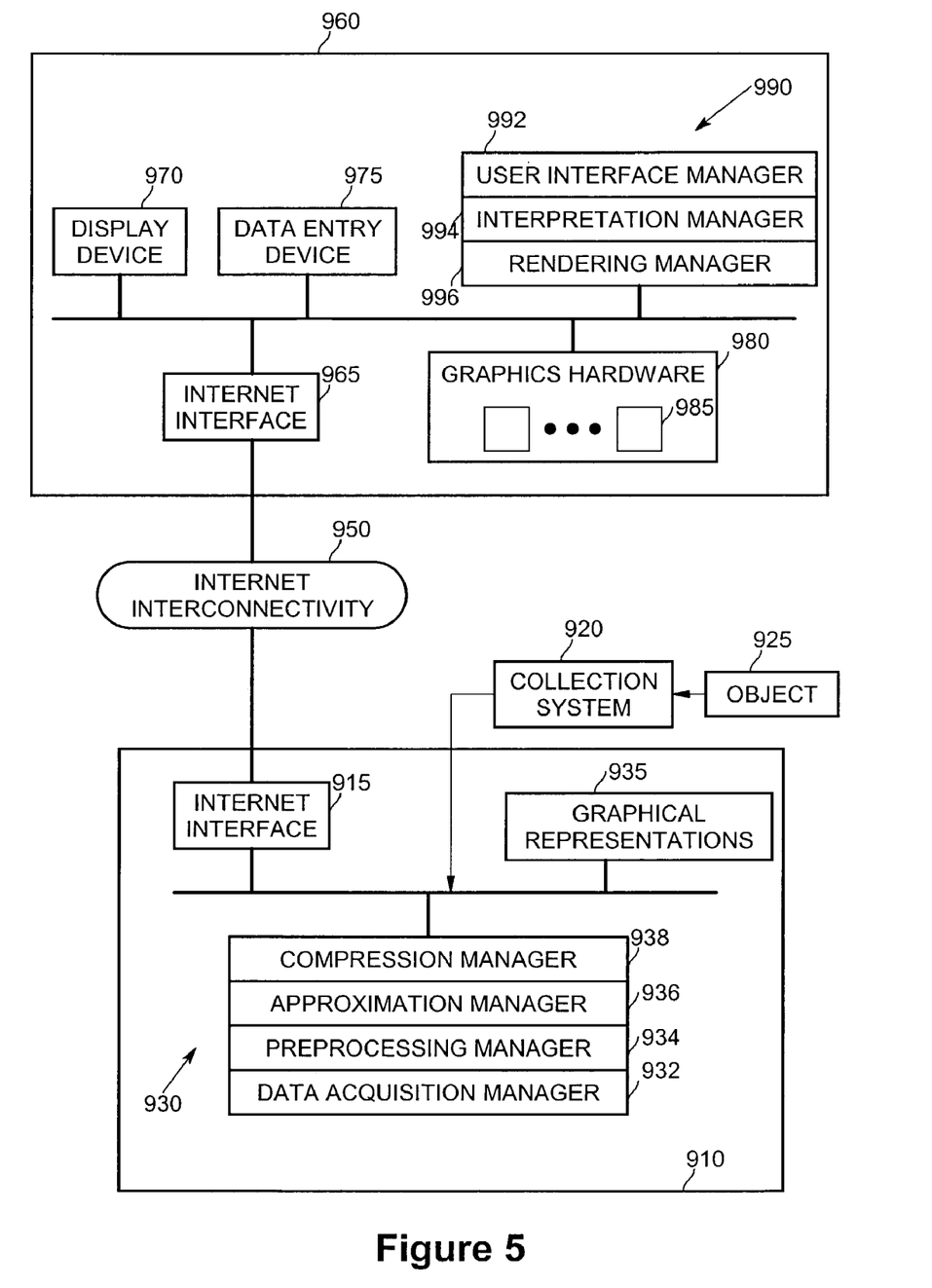
FIG. 5 is a diagram of an exemplary system for implementing the present invention over a network, such as the Internet, according to an embodiment of the present invention.

FIG. 5 shows an exemplary system 900 for delivering graphical content over a transmission medium, such as the Internet. Although an Internet transmission medium is described, other transmission mediums are possible, such as other computer networks (e.g., LANs, WANs, MANs), wireless communication devices such as pagers and phones, and other devices.

A first computer system 910 includes an Internet interface 915 to allow the first computer system to transmit graphical content via the Internet. The Internet comprises an Internet interconnectivity 950 that may include routers, switches, and the like to allow transmission of data. A second computer system 960 includes an Internet interface 965 to allow the second computer system to receive the graphical content via the Internet.

The first computer system typically includes a collection system 920 to input a graphical representation of an object 925. The collection system may include cameras, range scanners, and the like. Alternatively, the collection system and the object may not be used if the graphical representation is loaded from a computer-readable medium, or created using software. Typically, the first computer system will include components 930, typically software components, to acquire, process, and compress the graphical content that is to be transmitted. The components may include a data acquisition manager 932 to assist with acquiring graphical data for an object, such as from the collection system. A preprocessing manager 934 may be used to preprocess, resample, and standardize the graphical data prior to approximation. An approximation manager 936 may be used to create an approximate graphical representation based on the graphical data. A compression manager may be used to perform traditional compression on the approximate graphical representations. Naturally, there will be other components, such as components to enable the described components, and components to allow efficient interaction with the second computer system. For example, a component may be provided to determine how many approximation terms to transmit, by either requesting the information from the client, using a predetermined number for a certain speed of connection (e.g., more approximation terms for faster connections), monitoring congestion, and others. Typically, the approximate graphical representations will be prepared ahead of time and stored in a graphical representations library 935, which may be a memory or other computer-readable medium.

The first computer system transmits the approximate graphical representations and instructions that assist with interpreting and using the approximate graphical representations to the second computer system via the Internet interface. This will typically include transmitting a viewer, such as a plug-in to the second computer system's web browser as an add-on application. This may be transmitted during this session, or during a previous or subsequent session. It may be registered with the browser, so that it can be invoked when the browser receives or detects an incoming file format or data structure associated with the viewer. Once activated, the viewer may perform as a standalone application. For example, the viewer may use instructions that allow the second computer system to access the file format or data structure of the compressed data, interpret it in a way that is consistent with the method used to compress it, and use the data to display a representation of the object, such as on a display device. The instructions may allow multiprocessing, parallel processing, hardware accelerated rendering, or multitexturing to be used to display the object. According to one embodiment, instructions are available for multiple types of graphical hardware, such as multitexturing hardware from different hardware vendors. The second computer system may be examined to determine the appropriate instructions to use. Alternatively, the second computer system may receive instructions specific to the particular hardware at the second computer system. The viewer may allow the first computer system to display the graphical content automatically with little additional interaction from the user of the first computer system.

The second computer system typically includes a display device 970 to display the graphical representation, a data entry device 975, such as a keyboard or a curser control device, to allow data entry or specification of user preferences. The second computer system may also have graphics hardware 980, which may be multitexturing hardware with multiple texture operation units 985. The second computer system will typically include components 990, such as software components that may be provided by the viewer, to provide a useage interface, manage usage of the transmitted graphical data, and perform rendering based on the transmitted graphical data. The components may include a user interface manager 992, such as a graphical user interface, to allow the user to easily interact with the approximate graphical representation and the first computer system. An interpretation manager 994 may interpret the approximate graphical representation and operate on the representation to put it in a format that may be rendered. The interpretation manager may also perform decompression according to vector quantization, or other standard compression techniques if the light field maps have been compressed by these standard techniques. The rendering manager 996 assists with displaying the graphical representation of the object, such as on the display device. For example, the rendering manager may use multitexturing hardware to combine surface and view texture maps for a particular viewing direction, or may provide software to mimic the operations of this hardware. These components may perform additional operations, such as any of the operations discussed above for the viewer, or other components may be used to add functionality.

Consider an exemplary use of the system in which a user of the second computer system uses a browser to access a web page associated with the first computer system. The web page has graphical content (or links to graphical content) associated with approximate graphical representations in accordance with the invention. The first computer system transmits approximate graphical representations, such as data structures in particular formats in accordance with various embodiments of the present invention, to the second computer system. For example, it may transmit a geometry representation, such as a triangular mesh, and a reflectance representation, such as surface and view maps. The second computer system may use a viewer downloaded previously from the Internet, to use the transmitted graphical data to display the graphical content. The user may then use the viewer, which may provide functional buttons, dials, data entry locations, etc, and the data entry device to change a viewing direction, viewing distance, select another object, such as by selecting the object from a list, or search a remote database for another object. Other uses will be apparent to those skilled in the art.

As discussed herein, a "system", such as a system for approximating a graphical representation, may be an apparatus including hardware and/or software for processing data. The system may include, but is not limited to, a computer (e.g., portable, laptop, desktop, server, mainframe, personal digital assistant (PDA), set-top box, Internet tablet, cellular telephone, etc.), hard copy equipment (e.g., film recorder, optical disk burner, printer, plotter, fax machine, etc.), and the like.

Figure 6:
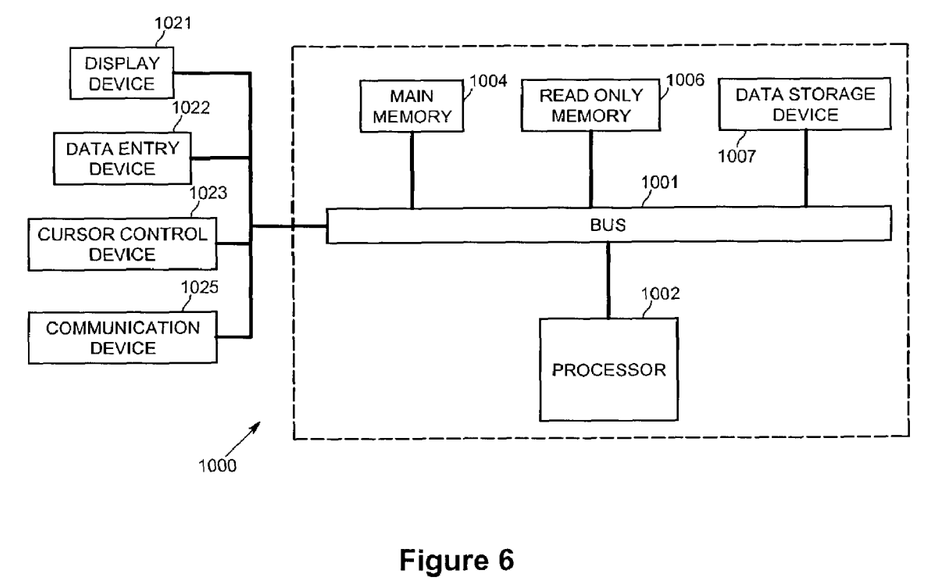
FIG. 6 is a block diagram of a processing system upon which an embodiment of the present invention may be implemented.

A computer system 1000 representing an exemplary workstation, host, or server in which features of the present invention may be implemented will now be described with reference to FIG. 6. The computer system 1000 represents one possible computer system for implementing embodiments of the present invention, however other computer systems and variations of the computer system 1000 are also possible. The computer system 1000 comprises a bus or other communication means 1001 for communicating information, and a processing means such as processor 1002 coupled with the bus 1001 for processing information. The computer system 1000 further comprises a random access memory (RAM) or other dynamic storage device 1004

(referred to as main memory), coupled to the bus 1001 for storing information and instructions to be executed by the processor 1002. The main memory 1004 also may be used for storing temporary variables or other intermediate information during execution of instructions by the processor 1002. In one embodiment, the main memory 1004 may be used for storing graphical representations, compression and approximation instructions, approximate graphical representations, and rendering instructions. The computer system 1000 also comprises a read only memory (ROM) and other static storage devices 1006 coupled to the bus 1001 for storing static information and instructions for the processor 1002. A data storage device 1007 such as a magnetic disk, zip, or optical disc and its corresponding drive may also be coupled to the computer system 1000 for storing information and instructions. In one embodiment, the data storage device 1007 may be used to access graphical representations and store approximate graphical representations to film, magnetic, optical, or other media.

The computer system 1000 may also be coupled via the bus 1001 to a display device 1021, such as a cathode ray tube (CRT) or Liquid Crystal Display (LCD), for displaying information to an end user. Typically, a data input device 1022, such as a keyboard or other alphanumeric input device including alphanumeric and other keys, may be coupled to the bus 1001 for communicating information and command selections to the processor 1002. Another type of user input device is a cursor control device 1023, such as a mouse, a trackball, or cursor direction keys for communicating direction information and command selections to the processor 1002 and for controlling cursor movement on the display 1021.

A communication device 1025 is also coupled to the bus 1001. Depending upon the particular implementation, the communication device 1025 may include a modem, a network interface card, or other well-known interface devices, such as those used for coupling to Ethernet, token ring, or other types of physical attachment for purposes of providing a communication link to support a local or wide area network, for example. In any event, in this manner, the computer system 1000 may be coupled to a number of clients or servers via a conventional network infrastructure, such as a company's intranet or the Internet, for example. The communication device may be used to send graphical representations to other computer systems.

The invention is not limited to any particular computer system. Rather, embodiments may be used on any stand alone, distributed, networked, or other type of computer system. For example, embodiments may be used on one or more computers compatible with NT, Linux, Windows, Macintosh, any variation of Unix, or others.

The present invention includes various steps, as described above. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Also, many uses of the present invention will be apparent to those skilled in the art. For example, the invention may be used to providing visual representations of objects in conjunction with selling those objects, such as on the Internet or otherwise, may be used to improve video games, may be incorporated in computer generated images such as to add special effects to feature films. For example, a graphical representation may be used to add a spaceship to a film scene, where the spaceship is viewed from different viewing directions under constant lighting conditions, such as those provided by a nearby star. The invention may also be used to add content to 3D TV or high definition TV (HDTV). The graphical representations may be included in machine-readable format, such as on a CD-ROM, and other uses.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of building an image-based model approximating an image comprising:
   partitioning samples of the image and parameters of an approximation set of functions relating to vertex radiance functions of the image-based model;
   determining dependency of the image samples on the approximation set parameters;
   defining an error function and data structures for computation of error derivatives using the image samples and approximation set parameters; and
   optimizing the approximation set parameters using the error function to produce the image-based model as a best approximation to the image.

2. The method of claim 1, further comprising removing redundant image samples.

3. The method of claim 1, wherein optimizing the approximation set parameters comprises applying a steepest descent algorithm.

4. The method of claim 1, wherein optimizing the approximation set parameters comprises applying a Newton method algorithm.

5. The method of claim 1, wherein optimizing the approximation set parameters comprises applying a conjugate gradient algorithm.

6. The method of claim 1, further comprising minimizing an error metric produced by the error function and adjusting the approximation set parameters according to the error metric to produce the image-based model as the best approximation to the image.

7. An article comprising: a storage medium having a plurality of machine accessible instructions, wherein when the instructions are executed by a processor, the instructions provide for building an image-based model approximating an image by partitioning samples of the image and parameters of an approximation set of functions relating to vertex radiance functions of the image-based model, determining dependency of the image samples on the approximation set parameters, defining an error function and data structures for computation of error derivatives using the image samples and approximation set parameters, and optimizing the approximation set parameters using the error function to produce the image-based model as a best approximation to the image.

8. The article of claim 7, further comprising removing redundant image samples.

9. The article of claim 7, wherein optimizing the approximation set parameters comprises applying a steepest descent algorithm.

10. The article of claim 7, wherein optimizing the approximation set parameters comprises applying a Newton method algorithm.

11. The article of claim 7, wherein optimizing the approximation set parameters comprises applying a conjugate gradient algorithm.

12. The method of claim 7, further comprising minimizing an error metric produced by the error function and adjusting the approximation set parameters according to the error metric to produce the image-based model as the best approximation to the image.

13. A system for building an image-based models approximating an image comprising:
 a first component to partition samples of the image and parameters of an approximation set of functions relating to vertex radiance functions of the image-based model, and to determine dependency of image samples on the approximation set parameters;
 a second component to define an error function and data structures for computation of error derivatives using the image samples and the approximation set parameters; and
 a third component to optimize the approximation set parameters using the error function to produce the image-based model as a best approximation to the image.

14. The system of claim 13, wherein the first component comprises a fourth component to remove redundant image samples.

15. The system of claim 13, wherein the third component optimizes the approximation set parameters by applying a steepest descent algorithm.

16. The system of claim 13, wherein the third component optimizes the approximation set parameters by applying a Newton method algorithm.

17. The system of claim 13, wherein the third component optimizes the approximation set parameters by applying a conjugate gradient algorithm.

18. The system of claim 13, wherein the third component minimizes an error metric produced by the error function and adjusts the approximation set parameters according to the error metric to produce the image-based model as the best approximation to the image.

* * * * *